US012785593B2

(12) United States Patent
Suzuki

(10) Patent No.: US 12,785,593 B2
(45) Date of Patent: Nov. 3, 2026

(54) METHOD FOR DETECTING FIELD MAGNET POSITION OF AN ELECTRIC MOTOR

(71) Applicant: SHINANO KENSHI KABUSHIKI KAISHA, Nagano (JP)

(72) Inventor: Kazuteru Suzuki, Nagano (JP)

(73) Assignee: SHINANO KENSHI KABUSHIKI KAISHA, Nagano (JP)

(*) Notice: Subject to any disclaimer, the term of this patent is extended or adjusted under 35 U.S.C. 154(b) by 175 days.

(21) Appl. No.: 18/985,973

(22) Filed: Dec. 18, 2024

(65) Prior Publication Data

US 2025/0253783 A1 Aug. 7, 2025

(30) Foreign Application Priority Data

Feb. 6, 2024 (JP) ................................ 2024-016131

(51) Int. Cl.
*H02P 6/18* (2016.01)
*H02P 6/20* (2016.01)

(52) U.S. Cl.
CPC .................. *H02P 6/18* (2013.01); *H02P 6/20* (2013.01); *H02P 2203/09* (2013.01); *H02P 2207/05* (2013.01)

(58) Field of Classification Search
CPC .......... H02P 6/18; H02P 6/20; H02P 2203/09; H02P 2207/05
See application file for complete search history.

(56) References Cited

U.S. PATENT DOCUMENTS 11,050,370 B2 6/2021 Yamamoto
11,152,879 B2 * 10/2021 Tachibana ............... H02P 21/32
2019/0253009 A1 8/2019 Yamamoto
2020/0266732 A1 * 8/2020 Kaidu ....................... H02P 6/20
2020/0295689 A1 * 9/2020 Tachibana ............... H02P 27/12

FOREIGN PATENT DOCUMENTS

JP 2018078695 5/2018

* cited by examiner

*Primary Examiner* — Zoheb S Imtiaz
(74) *Attorney, Agent, or Firm* — Stephen J. Weyer, Esq.; Stites & Harbison, PLLC

(57) ABSTRACT

A method reliably detects a field magnet position of a motor when starting a three-phase brushless motor that is driven according to PWM control with 120° energization, even when a power supply voltage fluctuates during sensing energization. An MPU 51 calculates a motor current Im according to Equation 1

$$Im = Vb/Rm\left(1 - e^{\left(-\frac{Rm}{Lm}\right)tb}\right) \quad \text{Equation 1}$$

where inductance of the electric motor is Lm, a resistance value is Rm, a pre-fluctuation driving voltage is Vb, and an energization time is tb. The MPU 51 then substitutes the motor current Im found by Equation 1 and a post-fluctuation driving voltage Va into Equation 2 produced by solving Equation 1 for time to calculate a new energization time ta.

$$ta = (Lm/Rm)\log_e(-Va/ImRm - Va) \quad \text{Equation 2}$$

Sensing energization is then performed for the energization time ta to specify the permanent magnetic field position.

2 Claims, 11 Drawing Sheets

METHOD FOR DETECTING FIELD MAGNET POSITION OF AN ELECTRIC MOTOR

CROSS-REFERENCE TO RELATED APPLICATION

This application is based upon and claims the benefit of priority of the prior Japanese Patent Application No. 2024-016131, filed on Feb. 6, 2024, and the entire contents of which are incorporated herein by reference.

TECHNICAL FIELD

The present disclosure relates to a method for detecting the field magnet position of an electric motor when the motor is started up during sensorless driving.

BACKGROUND ART

Although brushed DC motors are conventionally used as small direct current motors, problems relating to brush noise, electrical noise, and durability have led to the emergence of brushless DC motors. Attention has been focused more recently on sensorless motors, which do not have position sensors, from the perspectives of being smaller, lighter, more robust, and less costly. Sensorless motors were first used in hard disk drives and the like in the field of information equipment, and due to the development of vector control technology, adoption in the fields of home appliances and automobiles has also commenced.

FIG. 6 depicts the configuration of a three-phase brushless direct current (DC) motor as one example of a sensorless motor that is not equipped with a position sensor. A pair of permanent magnets 3, with one S pole and one N pole, is provided on a rotor 2 that rotates about a rotor shaft 1. The magnetic pole structure (IPM, SPM) and the number of poles of the permanent magnet field may have various configurations. Armature windings (or "coils") U, V, and W are disposed on pole teeth provided at a phase difference of 120° on a stator 4 and are connected in a star connection via a neutral point (or "common") C.

FIG. 7 is a block diagram of one example of a conventional sensorless driving circuit. "MOTOR" indicates a three-phase sensorless motor. "MPU 51" is a microcontroller (or "control section"). "INV 52" indicates a three-phase half-bridge inverter circuit (or "output section"). "RS 53" indicates a current sensor. "ADC 54" indicates an A/D converter that converts a current value to a digital value. Note that although an actual circuit further requires a power supply unit, a position sensor input unit or zero-cross comparator, a dummy common generation unit, a host interface unit and the like, such components have been omitted to simplify the description.

FIG. 8 is a timing chart of 120° energization as a typical example of a method of driving a three-phase brushless DC motor. Rectangular wave energization is performed from U-phase to V-phase in zone 1, from U-phase to W-phase in zone 2, from V-phase to W-phase in zone 3, from V-phase to U-phase in zone 4, from W-phase to U-phase in zone 5, and from W-phase to V-phase in zone 6. Broken lines indicate the waveforms of induced voltages. HU to HW are the output waveforms of a Hall sensor built into the motor, and in a conventional brushless DC motor equipped with a position sensor, excitation is switched based on this signal.

Since sensorless driving is unable to detect the rotor position when the motor has stopped or is rotating at low speed, a set-up starting method is widely used where the rotor is first forcibly positioned using fixed excitation and the rotational speed is then increased in an open loop. However, this method has drawbacks in that positioning needs to be performed using a large current and that positioning takes a long time, which delays the starting of the motor. Also, depending on the stopping position, a large reverse rotation may occur during positioning, which limits motor applications and in many cases, the motor cannot be used in a reciprocating mechanism or an application where rotation is caused by an external force. In addition, there is the problem of the motor being vulnerable against viscous loads and load fluctuations, making the motor susceptible to losing synchronization.

For this reason, a method has been proposed where when a motor is in a stopped state, a three-phase sensing pulse (that is, a constant-voltage rectangular wave pulse) voltage is sequentially applied to a three-phase coil to measure the energization time for a coil which does not have a branch at the neutral point and is the target phase to be measured, or the peak coil current is measured and its magnitude compared to instantaneously detect the stopped position of the permanent magnet field (see Patent Document 1; Japanese Laid-open Patent Publication No. 2018-78695).

SUMMARY OF INVENTION

Technical Problem

According to the method of detecting field magnet position for an electric motor in Patent Document 1 cited above, the permanent magnet field position in a stopped state can be detected and a two-phase energization can be performed with a 120° rectangular waveform to start the motor. This means that the motor can be started from the stopped state with closed-loop control at low cost using a simple driving circuit and control software. However, when the power supply voltage fluctuates as with a battery system, the driving voltage applied to the motor will fluctuate, which makes it difficult to measure the energization time of the phase to be measured and/or the peak coil voltage, and there may be a large increase in coil current. If the driving circuit is unable to cope with a large increase in the coil current, it will not be possible to detect the position of the rotor.

To make it possible to measure a large coil current, for digital control technologies, current measuring performance is determined by the performance of the A/D converter circuit that converts the current into a voltage. A/D converter circuits mainly have a resolution of 10 or 12 bits and measure current over a certain range by quantization. As one example, although the resolution is $3/4096 \approx 0.00073$ when dividing a coil current from 0 A to 3 A by 12 bits, if the coil current instead ranges from 0 A to 30 A, the resolution becomes $30/4096 \approx 0.0073$, indicating that the measurement resolution falls when the measurement range is expanded. When using the technology disclosed in Patent Document 1 or derivative technologies, it is often necessary to pass a sensing current that is larger than the current normally used by the motor. This results in a risk that the coil current cannot be measured due to fluctuations in the power supply voltage, or that the measurement resolution of the A/D converter circuit will fall, resulting in poor control performance.

FIGS. 17 to 19 are waveform diagrams of three-phase coil currents relative to the electric angle of the rotor when the driving voltage applied to a given motor are 12 V, 16 V, and 20 V and the energization time (or "on-duty") in a PWM cycle is 50 μsec. It can be understood from FIG. 17 to FIG. 18 that as the driving voltage increases, the coil current also increases. As depicted in FIG. 19, when the driving voltage has increased to 20 V, there is an increase in parts where the waveforms of the three-phase coil current overlap, which makes measurement difficult, and when the measurement limit (indicated by the dotted line) is exceeded, the coil current cannot be measured.

Solution to Problem

The present disclosure was conceived to solve the above problems, and has an object of providing a method of detecting the field magnet position of an electric motor that can reliably detect the field magnet position of the motor even if the power supply voltage fluctuates during sensing energization at start-up of a three-phase brushless motor which is sensorlessly driven according to PWM control with 120° energization.

According to an aspect of the present disclosure, there is provided a method for detecting a field magnet position of an electric motor, wherein the electric motor includes: a rotor with a permanent magnetic field; and a stator including a three-phase coil in a star connection, and starts according to sensorless driving through 120° rectangular wave energization, the motor further including: an output section that energizes a three-phase coil via a three-phase half-bridge-type inverter circuit; a control section which stores field magnet position information specifying a total of six energization directions for the three-phase coil and excitation switching zones for 120° energization corresponding to the energization directions, and which performs switching of an excitation state through switching control of the output section in keeping with a rotation instruction from a higher-order controller; a current detection section that is connected to the output section and detects a coil current; a timer section that measures a predetermined sensing energization time; and a measuring section that measures a coil current value from an output of the current detection section, the method including: a step of discharging any coil accumulated energy that has accumulated in the three-phase coil; a measurement step in which the control section sequentially selects one out of six energization directions, applies a constant voltage rectangular wave pulse to the three-phase coil for a predetermined time, and measures, using the measuring section, a coil current value after the predetermined time has elapsed; a step of storing the coil current value as measurement data; and a step of the control section selecting an energization direction where a measured value is maximized out of the measurement data of six energization directions, specifying the permanent magnetic field position from the field magnet position information corresponding to the maximum energization direction, and applying a voltage to the three-phase coil for a predetermined time to start the motor, wherein when a power supply voltage fluctuates during sensing, the control section calculates a motor current Im according to Equation 1

$$Im = Vb/Rm\left(1 - e^{\left(-\frac{Rm}{Lm}\right)t\,b}\right) \quad \text{Equation 1}$$

where inductance of the electric motor is Lm, a resistance value is Rm, a pre-fluctuation driving voltage is Vb, and an energization time is tb, calculates a new energization time ta by substituting the motor current Im found by Equation 1 and a post-fluctuation driving voltage Va into Equation 2 produced by solving Equation 1 for time, $$t\,a = (Lm/Rm)\log_e(-Va/ImRm - Va) \quad \text{Equation 2}$$

and performs sensing energization for the energization time ta and specifies the permanent magnetic field position.

According to another aspect of the present disclosure, there is provided a method for detecting a field magnet position of an electric motor, wherein the electric motor includes: a rotor with a permanent magnetic field; and a stator including a three-phase coil in a delta connection, and starts according to sensorless driving through 120° rectangular wave energization, the motor further including: an output section that energizes a three-phase coil via a three-phase half-bridge-type inverter circuit; a control section which stores field magnet position information specifying a total of six energization directions for the three-phase coil and excitation switching zones for 120° energization corresponding to the energization directions, and which performs switching of an excitation state through switching control of the output section in keeping with a rotation instruction from a higher-order controller; a current detection section that is connected to the output section and detects a coil current; a timer section that measures a predetermined sensing energization time; and a measuring section that measures a coil current value from an output of the current detection section, the method including: a step of discharging any coil accumulated energy that has accumulated in the three-phase coil; a measurement step in which the control section sequentially selects one out of six energization directions, applies a constant voltage rectangular wave pulse to the three-phase coil for a predetermined time, and measures, using the measuring section, a coil current value after the predetermined time has elapsed; a step of storing the coil current value as measurement data; and a step of the control section specifying a permanent magnetic field position from an energization direction where a measured value is maximized out of the measurement data of six energization directions and an energization direction where the measured value is next largest, and applying a voltage to the three-phase coil for a predetermined time to start the motor, wherein when a power supply voltage fluctuates during sensing, the control section calculates a motor current Im according to Equation 1

$$Im = Vb/Rm\left(1 - e^{\left(-\frac{Rm}{Lm}\right)t\,b}\right) \quad \text{Equation 1}$$

where inductance of the electric motor is Lm, a resistance value is Rm, a pre-fluctuation driving voltage is Vb, and an energization time is tb, calculates a new energization time ta by substituting the motor current Im found by Equation 1 and a post-fluctuation driving voltage Va into Equation 2 produced by solving Equation 1 for time, $$t\,a = (Lm/Rm)\log_e(-Va/ImRm - Va) \quad \text{Equation 2}$$

and performs sensing energization for the energization time ta and specifies the permanent magnetic field position.

In this way, when the driving voltage has fluctuated during sensing energization, the control section calculates the motor current Im according to Equation 1.

$$Im = Vb/Rm\left(1 - e^{\left(-\frac{Rm}{Lm}\right)}t\ b\right) \quad \text{Equation 1}$$

The control section calculates a new energization time ta by substituting the motor current Im found by Equation 1 and a post-fluctuation driving voltage Va into Equation 2 produced by solving Equation 1 for time.

$$t\,a = (Lm/Rm)\ \log_e(-Va/ImRm - Va) \quad \text{Equation 2}$$

The control section then applies a constant voltage rectangular wave pulse voltage for the energization time ta and specifies the permanent magnetic field position. By doing so, it is possible to detect the field magnet position of an electric motor and start the motor without being affected by fluctuations in driving voltage during sensing energization.

Advantageous Effects of Invention

There is provided a method of detecting the field magnet position of an electric motor that can reliably detect the field magnet position of and start the motor even if the power supply voltage fluctuates during sensing energization at start-up of a three-phase brushless motor which is sensorlessly driven according to PWM control with 120° energization.

DESCRIPTION OF EMBODIMENTS

Preferred embodiments of a method for detecting a field magnet position of an electric motor according to the present disclosure are described below with reference to the attached drawings. As one example of an electric motor, the present disclosure will be described using a sensorless motor that has a permanent magnetic field provided on the rotor, where windings in the stator are disposed at a phase difference of 120° in a star connection, and the phase ends are connected to a motor output section.

As one example, a method for detecting the position of the permanent magnetic field in a sensorless motor during sensorless driving of a three-phase DC brushless motor is described below together with the configuration of a sensorless motor driving device. One embodiment of a three-phase brushless DC motor according to the present disclosure will be described with reference to FIG. 6. In this example, a three-phase brushless DC motor equipped with a two-pole permanent magnet rotor and a three-slot stator 4 is depicted as an example. The motor referred to here may be an inner-rotor motor or an outer-rotor motor. Regarding the permanent magnetic field, the motor may be an internal permanent magnet (IPM) motor or a surface permanent magnet (SPM) motor.

Figure 6:
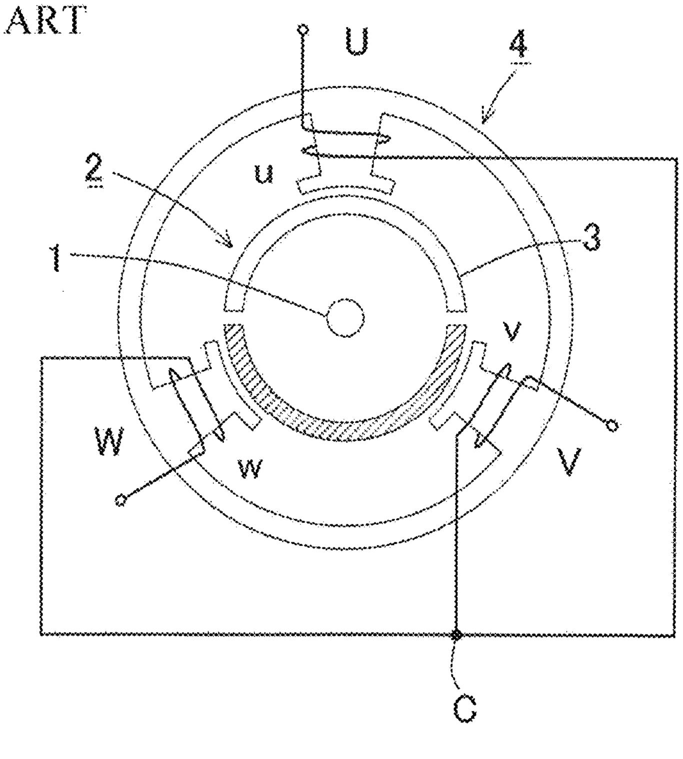
FIG.6 PRIOR ART
FIG. 6 is a diagram depicting the configuration of a star-connected three-phase brushless DC motor.
Figure 7:
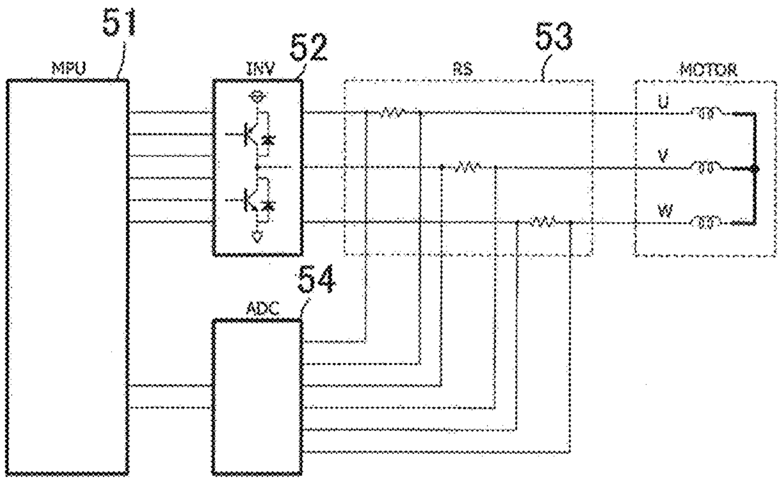
FIG.7 PRIOR ART
FIG. 7 is a block diagram of a conventional motor driving circuit.

In FIG. 6, the rotor 2 is integrally provided on a rotor shaft 1, and a two-pole permanent magnet 3 is provided as a field magnet. The stator 4 has pole teeth U, V, and W disposed facing the permanent magnet 3 with a phase difference of 120° between them. Windings u, v, and w are provided on each of the pole teeth U, V, and W of the stator 4 and these phases are wired in a star connection to a common point C to produce a three-phase brushless DC motor that is wired to a motor driving device, described later. Note that common wires are unnecessary and are therefore omitted here.

Figure 1:
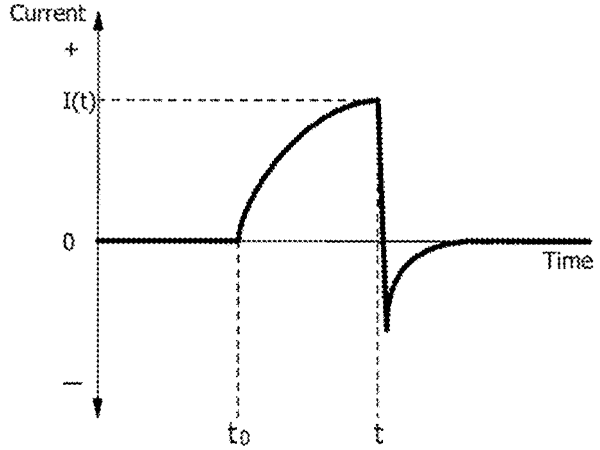
FIG. 1 is a schematic diagram of a coil current waveform when a constant voltage rectangular wave pulse is applied to a coil.

The principle used to detect the permanent magnet field position will now be described. When a pulse with a constant voltage is applied to a coil, the current will rise according to the following formula $$I(t) = (L/R)(1 - e^{(-t*R/L)})$$

where I is the coil current, L is the coil inductance, and R is the coil resistance. FIG. 1 is a schematic diagram of the current waveform when a constant voltage rectangular wave pulse is applied to a coil. Here, if the coil resistance R is constant and the energization time t is a predetermined value, the peak current value I(t) will reflect any change in the inductance L.

Next, a method of detecting the field magnet position where the peak current is measured with a pulse time t set at a predetermined value will be described. The rate of increase in current is large at positions where the inductance is small, and is small at positions where the inductance is large. Accordingly, the change in current in keeping with the rotor position will be the opposite of the change in pulse time when the peak current kept constant. Peak current values I1 to I6 when a short pulse is applied will change in keeping with the field magnet position due to the effects of reluctance. The change in peak current with respect to field magnet position has two periods, with one phase approximating to the following equation.

$$\Delta Ia = \cos 2\theta, \cos(2\theta + \pi)$$

(where θ=field magnet position)

The other two phases are obtained by changing the value of 0 by +120° and −120°.

The peak currents I1 to I6 produced when a pulse of an even longer duration is applied will change in keeping with the field magnet position due to the magnetic resistance varying with field polarity. Such changes in current with respect to the field magnet position has one period, with one phase roughly approximating to the following equation $$\Delta Ib = \cos 2\theta, \cos(2\theta + \pi)$$

(where θ=field magnet position and ΔIb=−1 when θ is 0 to π/2 and 3π/2 to 2π).

The other two phases are obtained by changing the value of θ by +120° and −120°.

Figure 9:
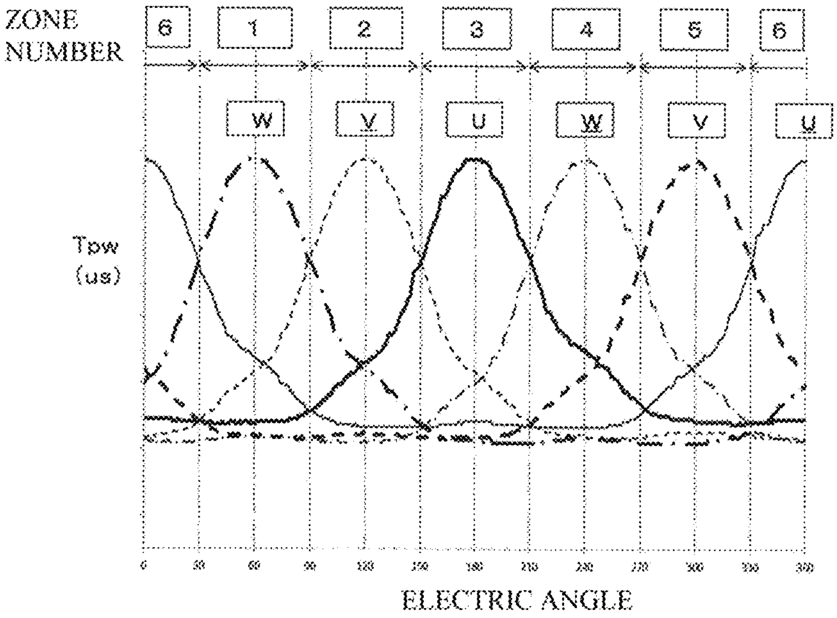
FIG. 9 is a graph depicting actual current values measured by a method where the peak current value is measured with a pulse time that is constant.

When pulses are applied for a long period, it is believed that the current value will reflect both the change in reluctance and the change in magnetic resistance, so that the change in current will approximate to ΔI=ΔIa+ΔIb. FIG. 9 depicts the measured waveform of changes in current when a long pulse is applied. A pulse of a predetermined length was applied in each of the six three-phase energization directions at 1° intervals and peak current was measured, meaning that a total of 2160 data points were plotted. The motor used here was the spindle motor of a hard disk drive.

As should be clear from FIG. 9, the energization direction with the maximum peak current value switches with a 60° pitch, which is the excitation interval for 120° energization.

Accordingly, if the energization direction where the peak current value is maximized is known, it is possible to uniquely determine the rotor position, which makes it possible to start the motor through 120° energization. The relationship between the maximum peak energization direction and field magnet position information can be determined from the maximum energization patterns in Tables 3 and 4 described later.

The three-phase energization directions of a three-phase motor will differ depending on the connection format of the motor. In the case of a star connection, there are six patterns as indicated in Table 1, and in the case of a delta connection, there are also six pattern as indicated in Table 2.

TABLE 1

| Star Connection | | |
|---|---|---|
| Pattern number | Phases connected to + side of power supply | Phases connected to ground |
| 1 | U | V, W |
| 2 | V, W | U |
| 3 | V | W, U |
| 4 | W, U | V |
| 5 | W | U, V |
| 6 | U, V | W |

TABLE 2

| Delta Connection | | |
|---|---|---|
| Pattern number | Phases connected to + side of power supply | Phases connected to ground |
| 1 | W | U |
| 2 | W | V |
| 3 | U | V |
| 4 | U | W |
| 5 | V | W |
| 6 | V | U |

Figure 2:
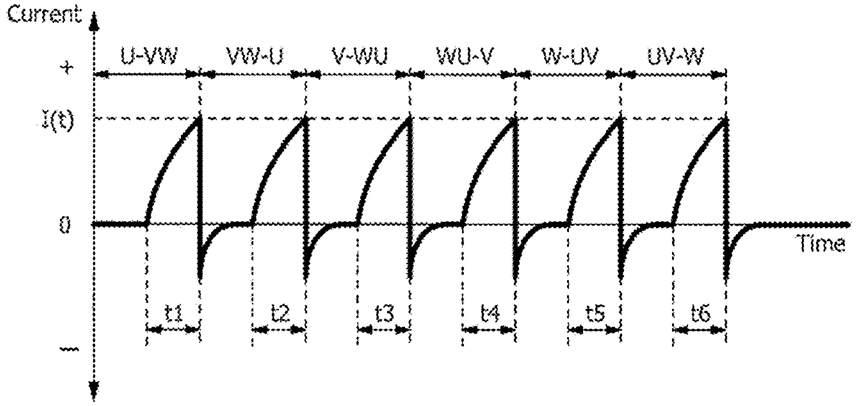
FIG. 2 is a waveform diagram of a coil current when measuring in six energization directions.
Figure 3:
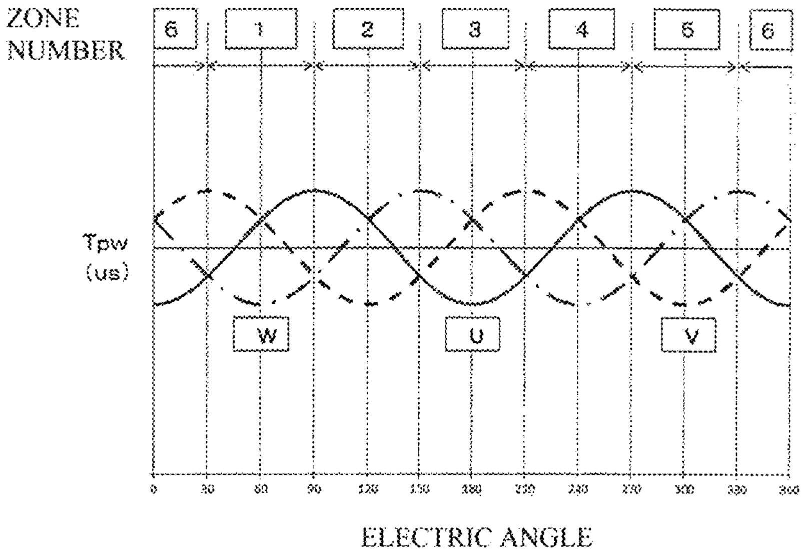
FIG. 3 is an approximate waveform diagram indicating the change in peak current value arrival time relative to field magnet position during energization with a small current.
Figure 4:
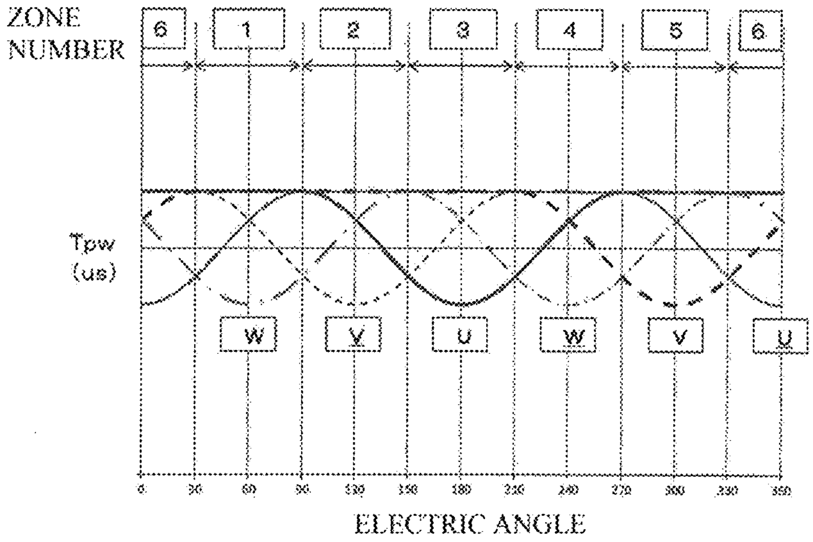
FIG. 4 is an approximate waveform diagram indicating the change in peak current value arrival time relative to field magnet position during energization with a large current.

FIG. 2 depicts the current waveform of a measured coil where, after an output off period is provided for a star-connected three-phase coil to enable the coil current to fall to zero, the six three-phase energization directions indicated above are selected in sequence and a high-frequency constant-voltage rectangular wave pulse is applied for a predetermined time. The method for detecting the rotor position using the sensing pulse described above measures the peak current value with the pulse time t set at a predetermined constant value.

The relationship between the maximum energization pattern and the permanent magnet field position information for the case of star connection is indicated in Table 3 below. Note that in Table 3, the maximum energization pattern is indicated as "W-UV" when, for example, the W phase is connected to the positive side of the power supply and the U and V phases are connected to ground (that is, the negative side). For reference purposes, the excitation pattern for the corresponding 120° energization is also indicated. The relationship between the maximum energization pattern and the next largest energization pattern and the permanent magnet field position information for a delta connection is indicated in Table 4 below. Note that in Table 4, an energization pattern is represented as "W-U" when, for example, the W phase is connected to the positive side of the power supply and the U phase is connected to ground (that is, the negative side). For example, the current pattern is indicated as "W-U" when the W phase is connected to the positive side of the power supply and the U phase is connected to ground (that is, the negative side). If energization of two phases is performed with the indicated excitation pattern, the motor will rotate forward, and if the energization direction is reversed, the motor will rotate in reverse.

TABLE 3

| Star Connection | | |
|---|---|---|
| Maximum Energization Direction | Field Magnet Position Information (electric angle) | 120° Excitation Zone |
| W-UV | 30° to 90° | U-V (Zone 1) |
| UW-V | 90° to 150° | U-W (Zone 2) |
| U-VW | 150° to 210° | V-W (Zone 3) |
| VU-W | 210° to 270° | V-U (Zone 4) |
| V-WU | 270° to 330° | W-U (Zone 5) |
| WV-U | 330° to 30° | W-V (Zone 6) |

TABLE 4

| Delta Connection | | |
|---|---|---|
| Maximum Energization Direction | Next Largest Energization Direction | Field Magnet Position Information (electric angle) |
| W-U | V-U | 0° to 30° |
| W-U | W-V | 30° to 60° |
| W-V | W-U | 60° to 90° |
| W-V | U-V | 90° to 120° |
| U-V | W-V | 120° to 150° |
| U-V | U-W | 150° to 180° |
| U-W | U-V | 180° to 210° |
| U-W | V-W | 210° to 240° |
| V-W | U-W | 240° to 270° |
| V-W | V-U | 270° to 300° |
| V-U | V-W | 300° to 330° |
| V-U | W-U | 330° to 360° |

First, a specific method of specifying the rotor position for the case of the star connection indicated in Table 3 will be described. When the motor has stopped, energization is performed in each of the six directions of three-phase energization for a certain period of time, and the peak current is measured. If the result indicates that the coil current value is maximized during U-VW energization, it can be known from Table 3 that the field magnet is located in the range of electric angle of 150° to 210°. If V-W excitation according to 120° rectangular wave energization is performed by connecting the V phase to the positive side of the power supply and the W phase to ground, the rotor will start rotating in the forward direction, and if W-V excitation is performed in the opposite direction, the rotor will rotate in the reverse direction. In this way, this technology makes it extremely easy to detect the field magnet position.

When the motor has stopped, energization is performed for a fixed period in each of the six directions of three-phase energization and the peak current is measured. The order of the energization patterns conforms to Table 1. If the result shows that the peak current value is maximized during U-VW energization, it can be understood from Table 2 that that the field magnet is located in the 150° to 210° zone. If V-W excitation is performed according to 120° energization by connecting the V phase to the positive side of the power supply and the W phase to ground, the rotor will start rotating in the forward direction and if W-V excitation is performed, the rotor will rotate in the reverse direction.

Figure 8:
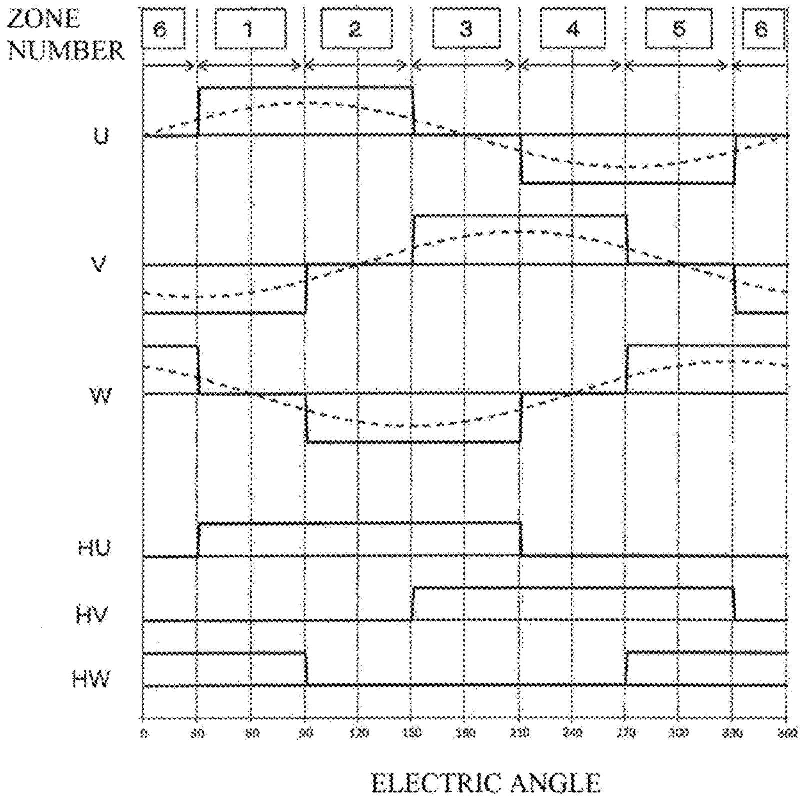
FIG.8 PRIOR ART
FIG. 8 is a timing chart of 120° energization.

Next, a method of specifying the rotor position for the case of the delta connection indicated in Table 4 will be described. When the motor has stopped, energization is performed for a certain period in each of the six directions of two-phase energization and the peak current is measured. The order of the energization patterns conforms to Table 2. If the result indicates that the coil current value is maximized during U-W energization, for example, it can be known from Table 4 that the field magnet position is located in the range of 180° to 240°. If it is assumed that the next largest energization pattern is the U-V energization pattern, it can be understood that the field magnet position is located in the 180° to 210° zone. At this time, if V-W excitation according to 120° energization is performed by connecting the V phase to the positive side of the power supply and the W phase to ground as depicted in FIG. 8, the rotor will start rotating in the forward direction and if W-V excitation is performed, the rotor will rotate in the reverse direction.

Although the driving voltage applied to the motor will fluctuate if the power supply voltage fluctuates during sensing energization, the MPU 51 will perform the following process to update the energization time. If the inductance of the motor is Lm, the resistance is Rm, the previous driving voltage was Vb, the energization time for one cycle is tb, and the motor current is Im, the motor current Im is found from $$Im = Vb/Rm\left(1 - e^{\left(-\frac{Rm}{Lm}\right)t\ b}\right) \qquad \text{Equation 1}$$

Solving Equation 1 for time gives Equation 2 below.

$$t\,a = \left(Lm/Rm\right)\log_e\left(-Va/ImRm - Va\right) \qquad \text{Equation 2}$$

Substituting the motor current Im calculated by Equation 1 and the post-fluctuation driving voltage Va into Equation 2 calculates the new energization time ta.

Figure 17:
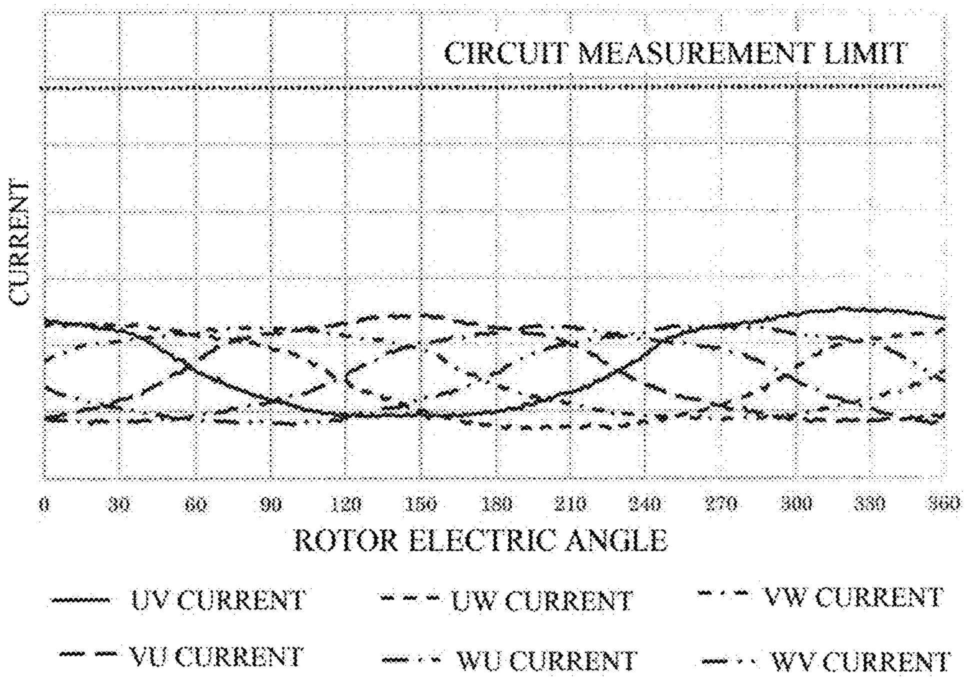
FIG.17 PRIOR ART
FIG. 17 is a waveform diagram of a coil current during sensing energization with a driving voltage of 12 V and an energization time of 50 μsec.
Figure 18:
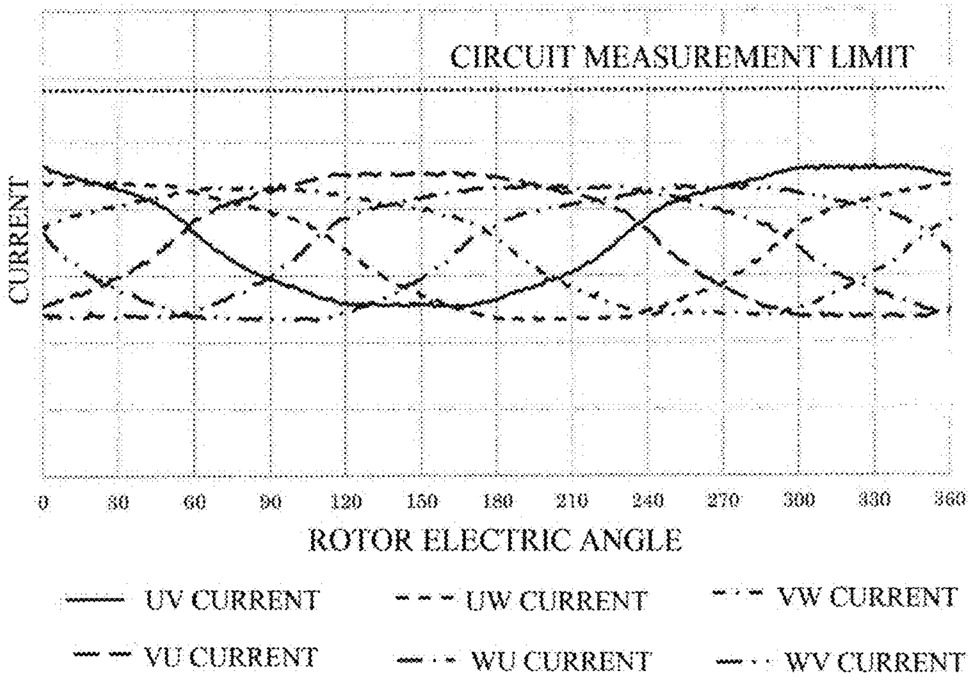
FIG.18 PRIOR ART
FIG. 18 is a waveform diagram of a coil current during sensing energization with a driving voltage of 16 V and an energization time of 50 μsec.
Figure 19:
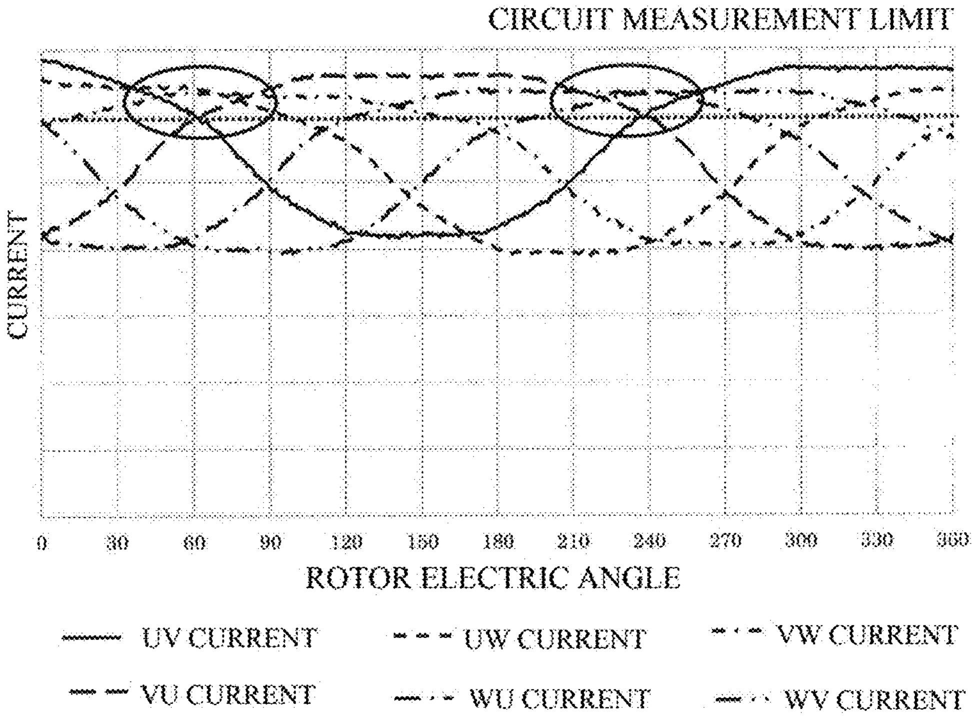
FIG.19 PRIOR ART
FIG. 19 is a waveform diagram of a coil current during sensing energization with a driving voltage of 20 V and an energization time of 50 μsec.

In more detail, the motor current Im is calculated by substituting an appropriate energization time tb obtained by actual measurement or simulation into Equation 1. In the graph in FIG. 17, from a state where the inductance of the motor is Lm, the resistance is Rm, the pre-fluctuation driving voltage Vb is 12 V, and the energization time tb in the previous cycle is 50 μsec, the new energization time ta for after the driving voltage has fluctuated to 16 V or 20 V is calculated using Equation 2. This produced a new energization time ta of around 28 μsec when the driving voltage has fluctuated to 16 V and a new energization time ta of around 19 μsec when the driving voltage has fluctuated to 20 V. The MPU 51 applies a constant voltage rectangular wave pulse voltage for this new energization time ta and specifies the permanent magnet field position.

Figure 12:
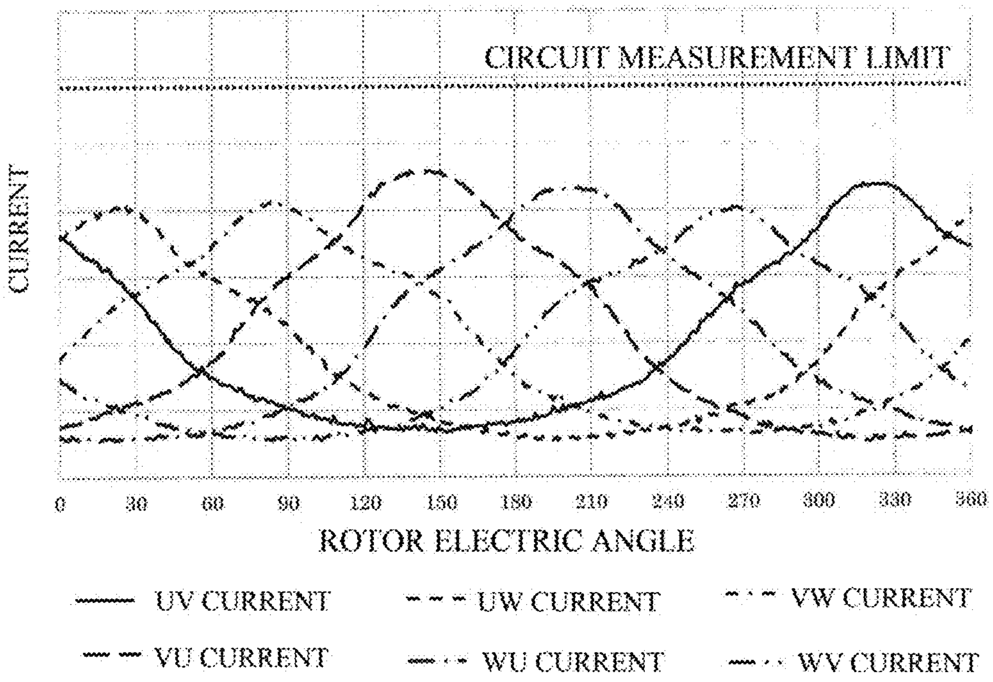
FIG. 12 is a waveform diagram of the coil current for sensing energization when the energization time has been set at 28 μsec after updating when the driving voltage has changed to 16 V from a state where the driving voltage was 12 V and the energization time was 50 μsec.
Figure 13:
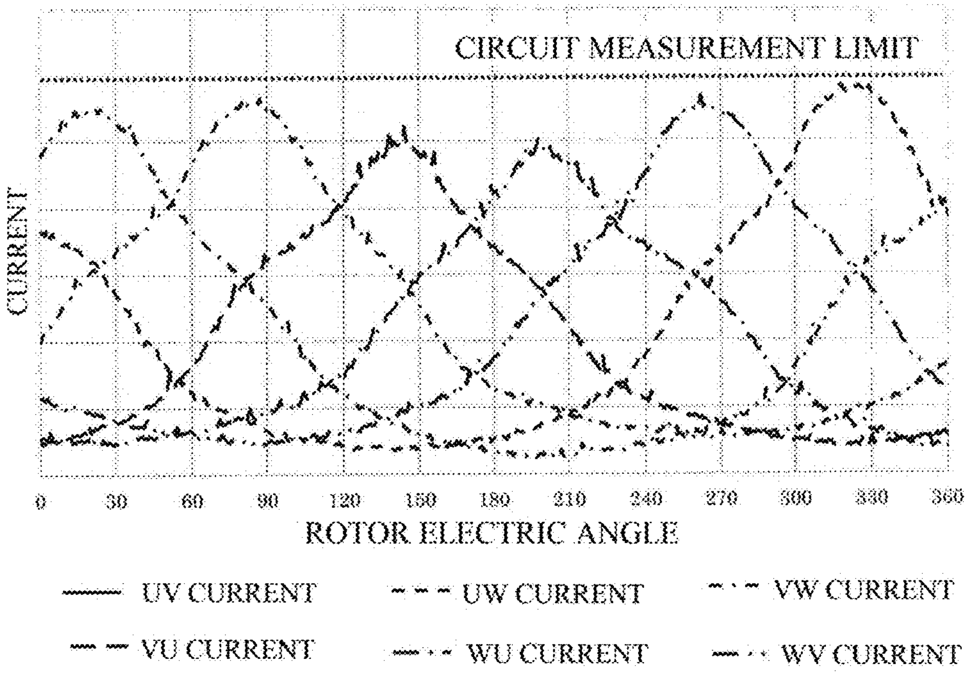
FIG. 13 is a waveform diagram of the coil current for sensing energization when the energization time has been set at 19 μsec after updating when the driving voltage has changed to 20 V from a state where the driving voltage was 12 V and the energization time was 50 μsec.

FIGS. 12 and 13 depict the waveforms of the measured coil current when sensing energization was performed for the new energization time ta described above. Although the coil current value will increase as the driving voltage Va increases, the coil current value will remain within the measurement limit (indicated by the dotted line), and there is no range where the current waveforms overlap and it would be difficult to distinguish the peak current value. The coil current increases as the driving voltage Va increases due to changes in the magnetic circuit caused by magnetic saturation. However, this is unavoidable since the rotor position is detected using changes in the magnetic circuit. With consideration to this, by setting the energization time ta that is updated after magnetic saturation to a minimum energization time that still enables an induced current to be detected, the increase in coil current due to the upward fluctuation in the driving voltage Va can be minimized.

Figure 14:
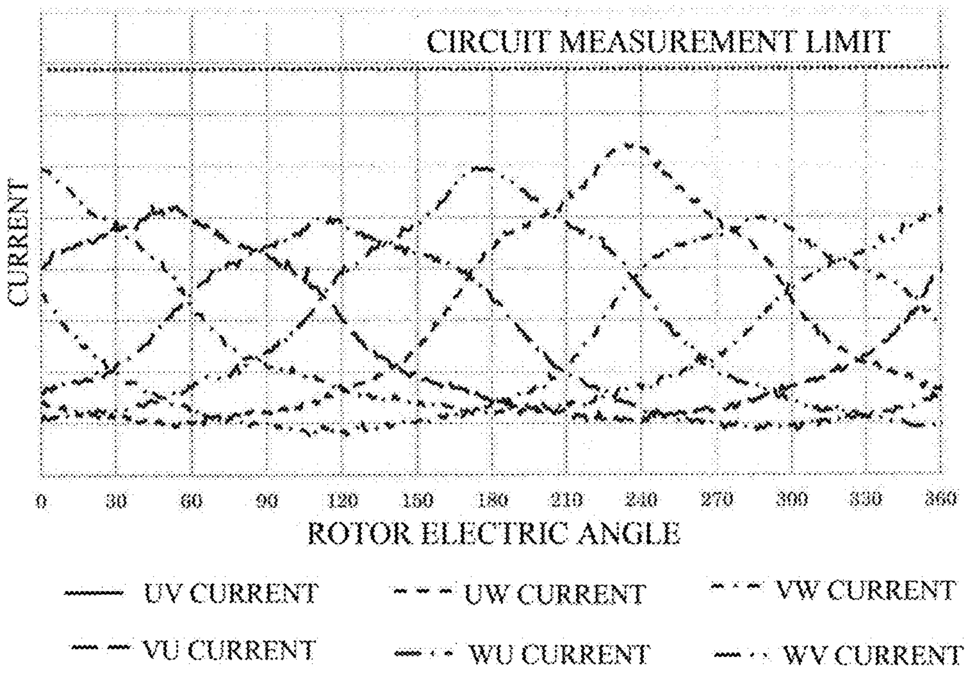
FIG. 14 is a waveform diagram of a coil current during sensing energization with a driving voltage of 12 V and an energization time of 29 μsec.
Figure 15:
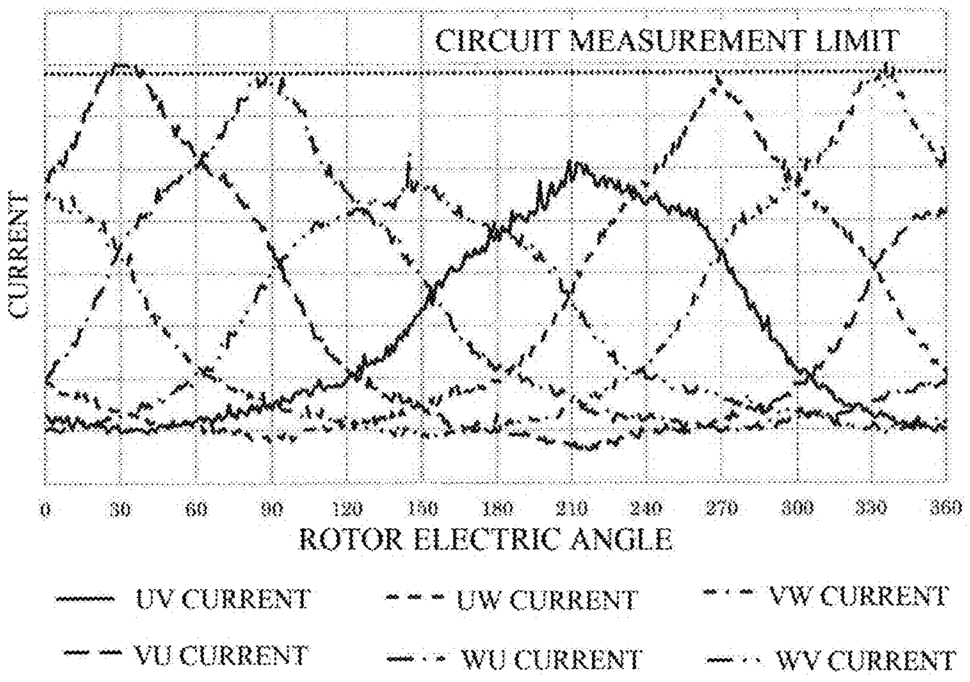
FIG. 15 is a waveform diagram of a coil current during sensing energization when the energization time has been set at 19 μsec after updating when the driving voltage has changed to 16 V from a state where the driving voltage was 12 V and the energization time was 29 μsec.
Figure 16:
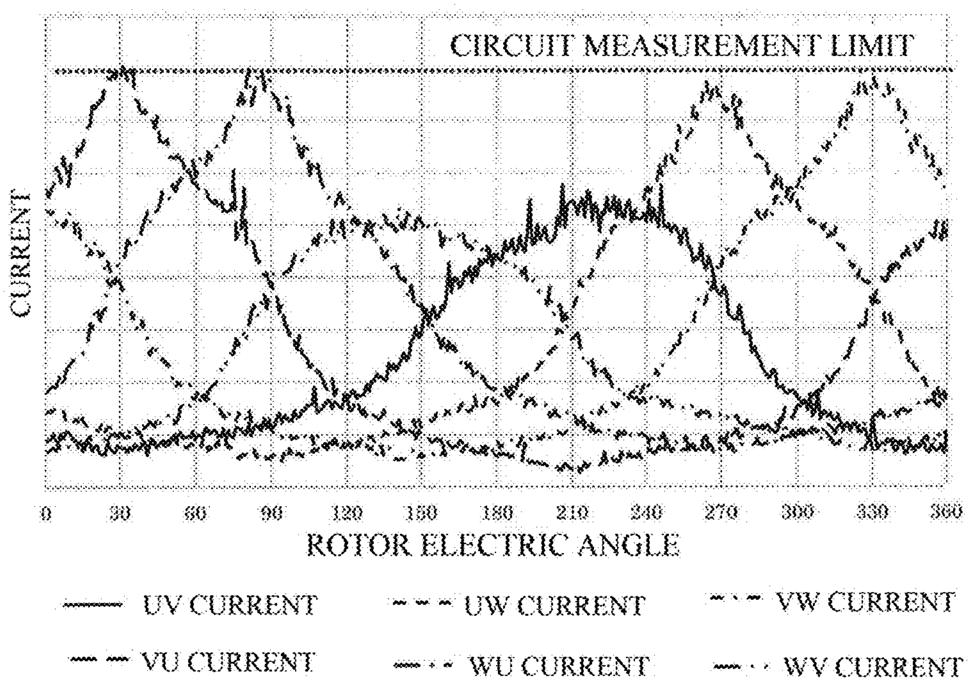
FIG. 16 is a waveform diagram of a coil current during sensing energization when the energization time has been set at 14 μsec by updating when the driving voltage has changed to 20 V from a state where the driving voltage is 12 V and the energization time is 29 μsec.

For the same motor, for a coil current value that was measured at the previous driving voltage Vb of 12 V and an energization time in the previous cycle of tb=29 μsec, a new energization time ta was calculated in the same way using Equation 2 for post-fluctuation driving voltages Va of 16 V and 20 V to produce ta=approximately 19 μsec when the driving voltage Va=16 V and ta=approximately 14 μsec when the driving voltage Va=20 V. Graphs of these results are given in FIGS. 14 to 16. For this example also, although the coil current value will increase when the driving voltage Va increases, the coil current value will remain within the range of the measurement limit, and there is no range where the current waveforms overlap, which would make it difficult to distinguish the peak current value. As described above, when a three-phase brushless motor is started using sensorless driving according to PWM control with 120-degree energization, it is possible to provide a method for detecting the field magnet position of a motor that can reliably detect the field magnet position of the motor and start the motor even when the power supply voltage fluctuates during sensing energization.

Figure 5:
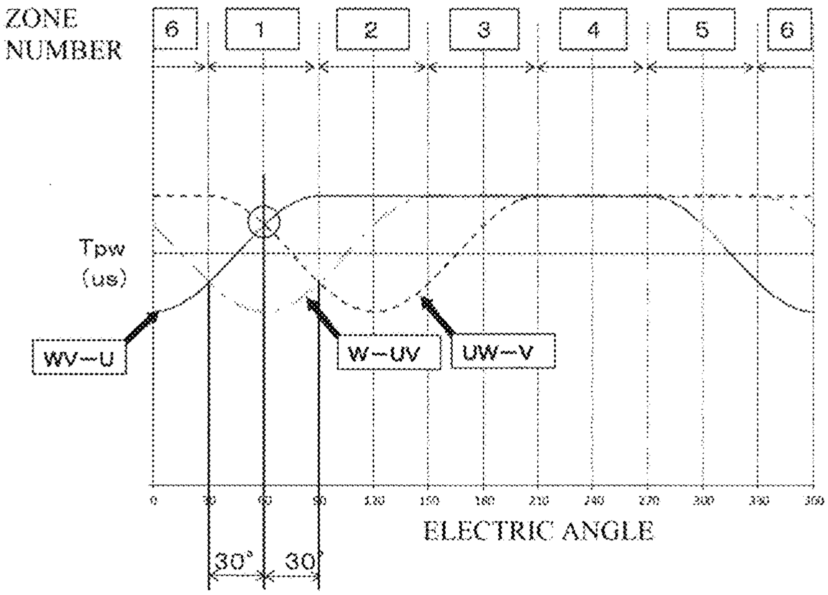
FIG. 5 is a diagram of peak current value arrival time for three energization directions in a star connection.

In addition, the profiles of the measurement data intersect at excitation switching points. Accordingly, the excitation switching points can be detected by periodically sensing the present range and direction of rotation for two energization patterns and comparing the magnitudes of two measurement data that have been obtained. In FIG. 5, when for example, the rotor is located in zone 1 between 30° and 90°, it can be understood from Table 3 that the energization direction in the present zone is W-UV energization. In addition, if the energization direction in the adjacent zone in the direction of rotation is the forward direction, it can also be understood that this is UW-V energization in zone 2. If sensing is performed in these two directions, the magnitude of the measurement data will reverse when the rotor passes 90°. Accordingly, it is possible to detect that the rotor has rotated into zone 2 and that the excitation pattern should be switched at this point. In the same way, by successively detecting switching points of the excitation zones and switching the excitation pattern, it is possible to seamlessly start the motor from a stopped state, or to continue low-speed rotation or the generation of stalling torque. Although it is necessary to shorten the sensing time as much as possible during rotation, by using the sensing method described above, the energization directions used in a stopped state are reduced from 6 to 2, which shortens the measurement time to one third. Although the measurement time will increase or decrease depending on conditions relating to the motor and the driving circuit, the measurement time will usually be around 300 μs.

In addition, by performing measurement in three energization directions, it is possible to determine the direction of rotation. By performing sensing periodically for the three energization directions corresponding to the current zone and the forward and reverse directions and comparing the magnitudes of the respective measurement data, it is possible to detect the excitation zone boundary point that will appear next in the forward or reverse direction and to determine the direction of rotation based on which excitation boundary point is detected first.

In FIG. 5, when it is assumed for example that the rotor is located in zone 1 between 30° and 90°, the excitation boundary point in the forward direction is 90°, which is the intersection between the W-UV energization direction and the UW-V energization direction. In the same way, the excitation boundary point in the reverse direction is 30°, which is the intersection of the W-UV energization direction and the WV-U energization direction. If the 90° intersection in the forward direction is detected before the 30° intersection in the reverse direction, it can be understood that the rotor has rotated forward. In the same way, if the 30° intersection is detected before the 90° intersection, it can be understood that the rotor has rotated in reverse. Accordingly, by performing sensing periodically in three energization directions of the current zone and the zones that are adjacent before and after, it is possible to determine the excitation zone boundary points and the direction of rotation. By doing so, any restrictions on the direction of rotation are eliminated and it is possible to rotate in either forward or reverse. In addition, even if the motor is forcibly rotated by an external force, it is possible to detect the position and generate torque in a freely chosen direction. Note that by using the sensing method described above, the number of current directions is reduced from six when the motor is in a stopped state to three, which reduces the measurement time by half.

Figure 10:
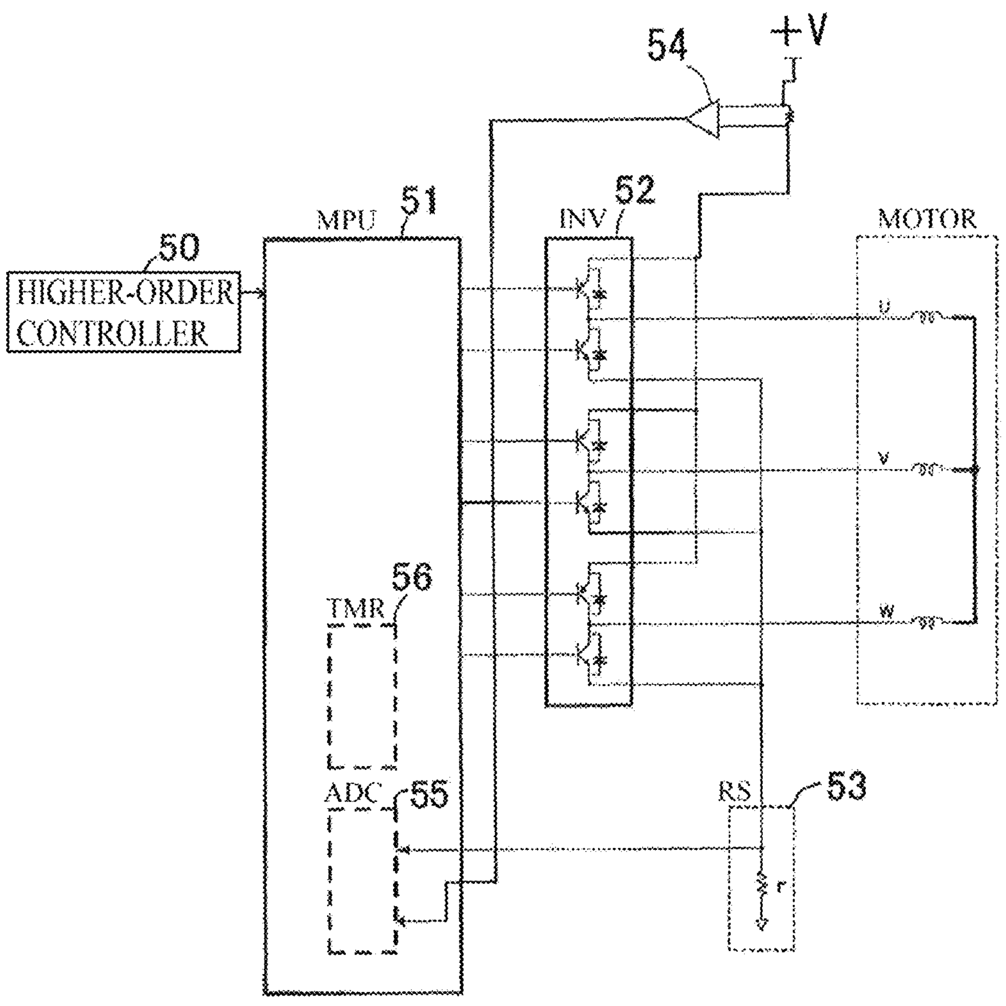
FIG. 10 is a diagram depicting a star-connected circuit subjected to a method of measuring peak current value with a pulse time that is constant.

Next, FIG. 10 depicts an example of a driving circuit for star-connected sensorless motor that applies a pulse for a predetermined time and measures the peak current value of the coil. The output of a current sensor 53 (current detection section) is sent to an A/D converter 55 (or ADC: Analog-to-Digital Converter, analog-to-digital conversion circuit, or A/D converter section). The A/D converter 55 measures the coil current value from the output of the current sensor 53. The A/D converter 57 does not need to be a high-performance converter, and an inexpensive converter built into the MPU 51 will be sufficient for actual use. As one example, a 12-bit ADC with a data acquisition time of 1 μs and a conversion time of about 20 μs is installed in a typical general-purpose MPU microprocessing unit, which is sufficient for the purposes of the present disclosure. With the above configuration, in the case of a star connection, the peak coil current value is measured for the six energization directions of three-phase energization based on Table 1, the field magnet position is detected from the measurement data for the maximum energization direction based on Table 3, and field magnet position information stored in advance in the MPU 51 that corresponds to the detected field magnet position is specified as the rotor position.

Figure 11:
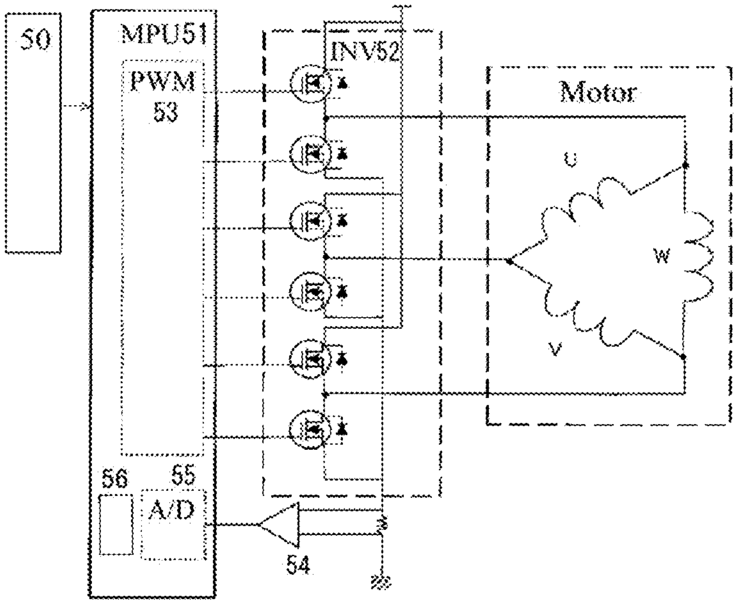
FIG. 11 is a diagram depicting a delta-connected circuit subjected to a method of measuring peak current value with a pulse time that is constant.

FIG. 11 depicts an example of a driving circuit for a delta-connected sensorless motor that applies a pulse for a predetermined time and measures the peak current value of the coil. The members that are the same as in FIG. 10 have been assigned the same reference numerals and explanation thereof is reused here. Six energization patterns for a two-phase coil and permanent magnet field position information are stored in advance in the memory of the MPU 51. The sensing time is set in advance by a timer circuit 56. Position detection is started by a rotation command or the like from a higher-order upper controller 50. When position detection starts, all outputs of a three-phase coil are turned off and the processing stands by for a predetermined time.

Next, constant voltage rectangular wave energization is performed from the inverter circuit 52 to a two-phase coil in a predetermined two-phase energization pattern and measurement by the A/D converter 55 is commenced. The A/D converter 55 measures the peak coil current value just before the end of sensing energization and stores this peak coil current value as measurement data. When the energization of the three-phase coil by the inverter circuit 52 is cut off, the discharging of any energy stored in the coil will commence.

After the forward-direction energization pattern of the two-phase coil being measured, energization is performed by selecting the reverse-direction energization pattern, and then the forward and then reverse-direction energization patterns are selected for the remaining two phases, so that constant voltage rectangular wave energization and the measurement of a peak coil current value by the A/D converter 55 are repeated for a total of six energization patterns. When the measurement is completed, the MPU 51 detects the field magnet position from the measurement data with the maximum energization direction and the next largest energization direction based on Table 4, and specifies the corresponding field magnet position information which is stored in advance in the MPU 51 as the rotor position.

A simple explanation of the actual measurement procedure is given below. First, energization of all three phases is turned off and a state where the coil current becomes zero is awaited. Next, in the case of a star connection, the six energization directions are individually selected one by one based on Table 1 (in the case of a delta connection, based on Table 2), a constant voltage rectangular wave pulse is applied to a three-phase coil to start sensing energization, and the timer circuit 56 stands by for a predetermined time. After the predetermined time has elapsed, the A/D converter 55 measures the coil peak current value from the output of the current sensor 53 and stores the coil peak current value as measurement data. After this, energization of all three phases is turned off again and a state where the coil current becomes zero is awaited.

When the driving voltage Vb used for constant-voltage rectangular wave energization fluctuates, a process of calculating the coil current Im using the Equation 1 described above, performing constant-voltage rectangular wave energization at the post-fluctuation driving voltage Va for the new energization time ta found using Equation 2 described above, and measuring the peak coil current value is repeated.

The MPU 51 selects the energization direction with the maximum value out of the six measured data. Next, for the case of star connection, the field magnet position information corresponding to the maximum energization pattern in Table 3 is specified as the permanent magnet field position (in the case of a delta connection, the field magnet position information is specified based on Table 4 as the permanent magnet field position from the measurement data with the maximum energization direction and the next largest energization direction).

What is claimed is:

1. A method for detecting a field magnet position of an electric motor, wherein the electric motor includes:

a rotor with a permanent magnetic field; and a stator including a three-phase coil in a star connection, and starts according to sensorless driving through 120° rectangular wave energization, the motor further including:

an output section that energizes a three-phase coil via a three-phase half-bridge-type inverter circuit;

a control section which stores field magnet position information specifying a total of six energization directions for the three-phase coil and excitation switching zones for 120° energization corresponding to the energization directions, and which performs switching of an excitation state through switching control of the output section in keeping with a rotation instruction from a higher-order controller;

a current detection section that is connected to the output section and detects a coil current;

a timer section that measures a predetermined sensing energization time; and a measuring section that measures a coil current value from an output of the current detection section, the method comprising:

a step of discharging any coil accumulated energy that has accumulated in the three-phase coil;

a measurement step in which the control section sequentially selects one out of six energization directions, applies a constant voltage rectangular wave pulse to the three-phase coil for a predetermined time, and measures, using the measuring section, a coil current value after the predetermined time has elapsed;

a step of storing the coil current value as measurement data; and a step of the control section selecting an energization direction where a measured value is maximized out of the measurement data of six energization directions, specifying the permanent magnetic field position from the field magnet position information corresponding to the maximum energization direction, and applying a voltage to the three-phase coil for a predetermined time to start the motor, wherein when a power supply voltage fluctuates during sensing, the control section calculates a motor current Im according to Equation 1

$$Im = Vb/Rm\left(1 - e^{\left(-\frac{Rm}{Lm}\right)}t\ b\right) \qquad \text{Equation 1}$$

where inductance of the electric motor is Lm, a resistance value is Rm, a pre-fluctuation driving voltage is Vb, and an energization time is tb, calculates a new energization time ta by substituting the motor current Im found by Equation 1 and a post-fluctuation driving voltage Va into Equation 2 produced by solving Equation 1 for time, $$t\,a = (Lm/Rm)\ \log_e(-Va/ImRm - Va) \qquad \text{Equation 2}$$

and performs sensing energization for the energization time ta and specifies the permanent magnetic field position.

2. A method for detecting a field magnet position of an electric motor, wherein the electric motor includes:

a rotor with a permanent magnetic field; and a stator including a three-phase coil in a delta connection, and starts according to sensorless driving through 120° rectangular wave energization, the motor further including:

an output section that energizes a three-phase coil via a three-phase half-bridge-type inverter circuit;

a control section which stores field magnet position information specifying a total of six energization directions for the three-phase coil and excitation switching zones for 120° energization corresponding to the energization directions, and which performs switching of an excitation state through switching control of the output section in keeping with a rotation instruction from a higher-order controller;

a current detection section that is connected to the output section and detects a coil current;

a timer section that measures a predetermined sensing energization time; and a measuring section that measures a coil current value from an output of the current detection section, the method comprising:

a step of discharging any coil accumulated energy that has accumulated in the three-phase coil;

a measurement step in which the control section sequentially selects one out of six energization directions, applies a constant voltage rectangular wave pulse to the three-phase coil for a predetermined time, and measures, using the measuring section, a coil current value after the predetermined time has elapsed;

a step of storing the coil current value as measurement data; and a step of the control section specifying a permanent magnetic field position from an energization direction where a measured value is maximized out of the measurement data of six energization directions and an energization direction where the measured value is next largest, and applying a voltage to the three-phase coil for a predetermined time to start the motor, wherein when a power supply voltage fluctuates during sensing, the control section calculates a motor current Im according to Equation 1

$$Im = Vb/Rm\left(1 - e^{\left(-\frac{Rm}{Lm}\right)t\,b}\right) \quad \text{Equation 1}$$

where inductance of the electric motor is Lm, a resistance value is Rm, a pre-fluctuation driving voltage is Vb, and an energization time is tb, calculates a new energization time ta by substituting the motor current Im found by Equation 1 and a post-fluctuation driving voltage Va into Equation 2 produced by solving Equation 1 for time, and $$t\,a = (Lm/Rm)\log_e(-Va/ImRm - Va) \quad \text{Equation 2}$$

performs sensing energization for the energization time ta and specifies the permanent magnetic field position.

* * * * *